United States Patent [19]

Haines

[11] 4,431,088
[45] Feb. 14, 1984

[54] INTERNAL SHOE DRUM BRAKE ADJUSTING DEVICE

[75] Inventor: William E. Haines, Southam, England

[73] Assignee: Automotive Products Limited, Leamington Spa, England

[21] Appl. No.: 300,686

[22] Filed: Sep. 9, 1981

[51] Int. Cl.³ .................. F16D 51/52; F16D 65/52
[52] U.S. Cl. .................. 188/79.5 GC; 188/79.5 GT; 188/196 B
[58] Field of Search .................. 188/79.5 P, 79.5 GC, 188/196 V, 196 B, 196 R, 79.5 GT, 196 F, 79.5 GE; 192/111 A

[56] References Cited

U.S. PATENT DOCUMENTS

| | | | |
|---|---|---|---|
| 3,016,990 | 1/1962 | Towns | 188/196 F |
| 3,339,678 | 9/1967 | Burnett | 188/196 B |
| 4,217,973 | 8/1980 | Johns et al. | 188/79.5 P |
| 4,232,766 | 11/1980 | Rupprecht | 188/79.5 P |

FOREIGN PATENT DOCUMENTS

| | | |
|---|---|---|
| 2010907 | 10/1971 | Fed. Rep. of Germany . |
| 2644575 | 1/1980 | Fed. Rep. of Germany . |
| 1191320 | 5/1970 | United Kingdom . |
| 1314230 | 4/1973 | United Kingdom . |

Primary Examiner—Bruce H. Stoner, Jr.
Assistant Examiner—Robert J. Oberleitner
Attorney, Agent, or Firm—Kemon & Estabrook

[57] ABSTRACT

An internal shoe drum brake automatic adjuster comprising a strut extending between one brake shoe and a wedge, mounted between the strut and an abutment on a second brake shoe. The wedge is spring loaded to increase the spacing between the adjacent end of the strut and the abutment. The wedge has serrations thereon that engage with a pawl on the second brake shoe so that the wedge can only move to increase said spacing and not in the reverse direction. There is also provided a brake in which the strut is engageable with a mechanical lever pivoted to the one brake shoe. The brake is de-adjusted by moving the lever so that it no longer contacts the strut.

2 Claims, 4 Drawing Figures

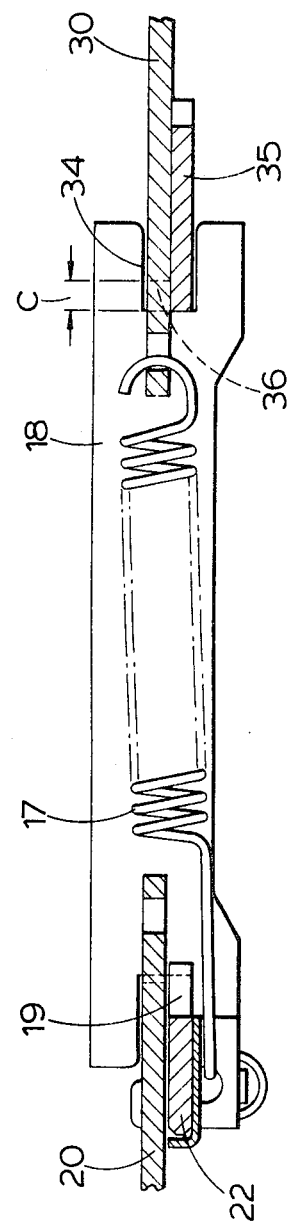
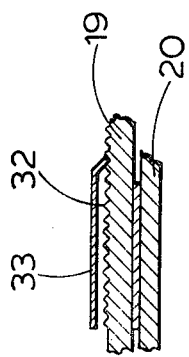
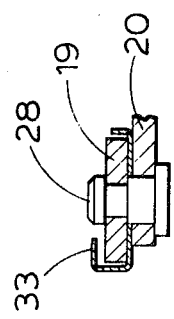

INTERNAL SHOE DRUM BRAKE ADJUSTING DEVICE

This invention relates to automatic adjusters for internal shoe drum brakes for maintaining a substantially constant clearance between the brake linings and the internal surface of the brake drum.

Such adjuters are shown in our British Pat. No. 1 314 230, and in German Auslegeschrift No. 26 44 575. In both the above specifications a strut extends between one brake shoe and a wedge member mounted on the other brake shoe. The wedge is spring biased to increase the spacing between the end of the strut and an abutment on the other shoe. The strut is biased against the wedge by a spring extending from the other brake shoe to the strut, and a second spring is utilised to take up a lost motion connection between the strut and the one brake shoe.

Sometimes it is possible for the loads acting sideways on the wedge to cause the brake to deadjust.

The present invention seeks to provide a wedge and strut adjuster which overcomes this disadvantage.

Accordingly, there is provided an internal shoe drum brake having an automatic adjuster and comprising two brake shoes, a strut extending from one of said brake shoes towards the other of said brake shoes, an abutment means on said other brake shoe, a wedge mounted on said other brake shoe and being located between the abutment and the strut, and being spring biased to increase the spacing between the abutment and the strut and having serrations on a surface thereof, a pawl secured on said other brake shoe and engagable with the serrations on the wedge so that the wedge is movable to increase said spacing but not in the reverse direction.

The invention will be described by way of example and with reference to the accompanying drawings in which:

FIG. 2 is a part section on the line II—II of FIG. 1;

FIG. 3 is a section on the line III—III of FIG. 1; and

FIG. 4 is a section on the line IV—IV of FIG. 1.

Figure 1:
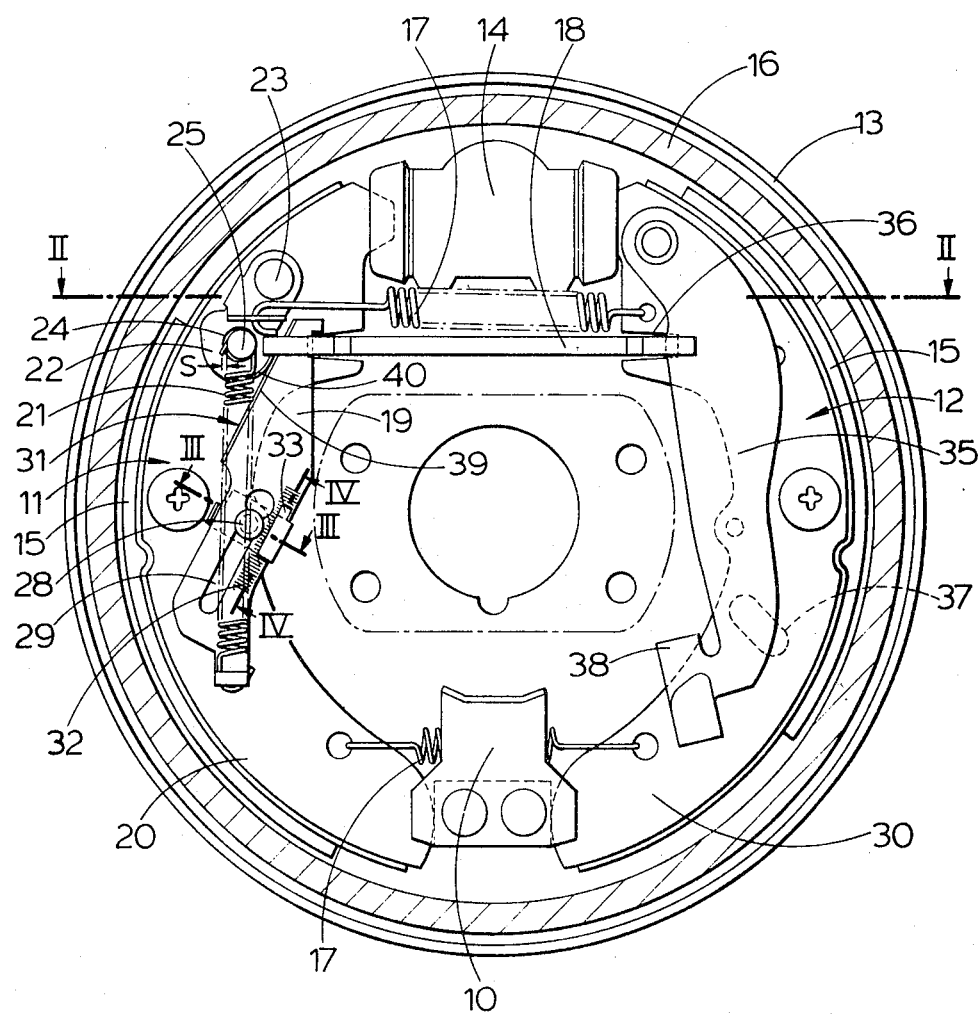
FIG. 1 is an elevation of a brake drum assembly having an adjusting device according to this invention.

With reference to FIGS. 1 to 4, an internal shoe drum brake assembly has a pair of arcuate brake shoes 11 and 12 mounted on a back plate 13. A hydraulic double ended cylinder 14 is mounted between one pair of adjacent ends of the brake shoes 11 and 12 so as to move that pair of ends apart when the brakes are applied. The other pair of adjacent ends of the shoes 11 and 12 pivot on an abutment 10 mounted on the back plate.

When the hydraulic cylinder 14 is operated the brake shoe linings 15 are thrust against the internal surface of a brake drum 16, and when the brakes are released a pair of pull-off springs 17 retract the linings 15 away from the drum 16. The space between linings 15 and the internal surface of the drum is kept substantially constant as the linings wear. To this end an automatic brake adjusting mechanism is mounted between the end portions of the shoes 11 and 12 adjacent the hydraulic cylinder 14. The automatic adjuster mechanism comprises a strut 18 having a slot 34 on one end thereof that locates in a slot 36 in the web 30 of the one brake shoe 12, and extends between the web 30 and a wedge 19 mounted on the web 20 of the other shoe 11.

The slot 34 in the one end of the strut also accommodates a mechanically applied lever 35 pivoted to the end of the shoe 12 adjacent the hydraulic cylinder 14. The lever 35 is shown in the normal service 'off' position and is held in the position shown by an abutment 38 on its free end which locates against the web 30. The strut 18 reacts back onto the lever 35 and not onto the shoe web 30, and this is accommodated by clearance 'C' in slot 36 in the web 30 (see FIG. 2). To deadjust the brakes a screwdriver is inserted through an aperture 37 in the back plate 13 and the lever 35 lifted until the abutment 38 on its free end comes clear of the web 30. The lever 35 can now be pivoted anti-clockwise until the upper end of the lever no longer contacts the strut 18. The clearance 'C' is now taken up under the bias of the springs 17 and the brake deadjusted to allow the drum 16 to be removed for servicing of the brake assembly.

The wedge 19 is biased upwards by a spring 21 to increase the spacing between the end of the strut 18 and an abutment 22 on the web 20. The abutment 22 is pivoted at one end by a pin 23 to the web 20 and its free end is spring loaded by the pull-off spring 17 against one side of the wedge 19. The movement of the abutment 22 about the pin 23 is limited by a lost motion connection between the abutment and the shoe 11. The lost motion connection consists of a circular hole 24 in the abutment and a round peg 25 fixed to the web 20 and loosely engaging the hole 24. Thus the wedge 19 and strut 18 form a cross member between the two shoes 11 and 12 whose overall length can increase as the wedge moves upwards. The upwards movement of the wedge is guided by a pin 28 fixed to the web 20 and engaging a slot 29 in the wedge 19.

The inclined edge 31 of the wedge 19 adjacent the abutment has serrations 39 thereon that engage similar serrations 40 on the abutment 22. The upper surface of the wedge away rom the shoe web 20 has also serrations 32 thereon for engagement with a pawl 33 fitted to the pin 28 so that the wedge 19 can only move upwards to increase the spacing between the abutment 22 and the strut 18 and not in the reverse direction.

When the brakes are in the "ready-for-use" condition, the spring 17 pulls the abutment 22 against the serrated edge 31 of the wedge 19 and pulls the wedge into engagement with the strut 18.

When the brakes are applied, the shoes 11 and 12 are moved apart by the cylinder 14. As the shoes move apart, the spring 17 holds the free end of the abutment 22 against the wedge 19 and the peg 25 moves outwards. If the total gap between the linings 15 and the drum is less than the space 'S' between the peg 25 in its starting position and the side of the hole 24, then on release of the brakes the shoes will retract without readjustment taking place.

If, however, the total gap between the linings 15 and the drum exceeds the space 'S', when the brakes are applied the peg 25 abuts the side of the hole 24 and starts to rotate the abutment 22 away from the wedge 19. When the excess gap is less than the fall back between the serrations on the edge 31, and abutment 22, the serrations do not fully disengage and on retraction of the shoes the abutment 22 will move against the wedge causing it to re-engage the wedge 19 without readjustment taking place.

When the excess gap exceeds the space 'S' plus the fall back between the serrations, the peg 25 moves the abutment 22 away from the side of the wedge so that the spring 21 can move the wedge upwards until such point at which the wedge again contacts the abutment and the serrations partially re-engage. When the brakes are released the shoes 11 and 12 retract and the serrations fully engage and the spring 17 pulls shoes together to move the peg 25 rightwards compared to the hole 24 in the abutment. The previous upwards movement of the wedge will have extended the overall length of the cross member constituted by the wedge 19 and strut 18.

Thus a substantially constant clearance between the linings 15 and the drum 16 of the distance 'S' plus the "fall back" of the serrations is maintained. The serrations 32 on the surface of the wedge away from the web 20 prevent the load in the pull-off springs 17 from moving the wedge in a deadjusting direction.

Whilst the adjuster has been described with the strut 18 attached directly to the one brake shoe 12, it is envisaged that this invention would extend to the situation where the strut 18 is located in a slot in a hand brake operating lever pivoted on the shoe 12.

I claim:

1. An internal shoe drum brake having an automatic adjuster and comprising:
   two brake shoes, each with a web thereon;
   a strut assembly extending from one of said brake shoes to the other of said brake shoes;
   an adjuster means for varying the overall length of the strut assembly operative between the two shoes;
   a spring biassing the two brake shoes together;
   a mchanical brake lever pivoted to the web of said one brake shoe and which has a free end thereof operable by mechanical means to apply the brake and which is abuttable against the web of the one shoe, said spring loading the strut against the mechanical lever during normal service use of the brake, and the drum brake is deadjusted by moving the free end of the lever out of abutment with the web of said one shoe so that the free end of the lever can be moved so that the lever no longer contacts the strut.

2. An internal shoe drum brake having an automatic adjuster and comprising:
   two brake shoes each having a web thereon;
   a strut extending from one of said brake shoes towards the other of said brake shoes;
   an abutment means on said other brake shoe;
   a pin fixed to the web of said other brake shoe;
   a wedge slidably mounted for rectilinear movement on said other brake shoe by means of a slot in the wedge which engages with said pin, the wedge being located between the abutment and the strut, being spring biased to increase the spacing between the abutment and the strut and having serrations on the surface directed away from the surface of said other brake shoe; and
   a pawl secured to said other brake shoe by said pin and engagable with the serrations on the wedge so that the wedge is movable to increase said spacing but not in the reverse direction.

* * * * *